United States Patent [19]

Thralls

[11] Patent Number: 4,902,065
[45] Date of Patent: Feb. 20, 1990

[54] ROOF BOW SUPPORT FOR COVERS ON TRUCK BEDS

[76] Inventor: Ed Thralls, Rte. 2, Box 271, Mitchell, Ind. 47446

[21] Appl. No.: 313,907

[22] Filed: Feb. 23, 1989

[51] Int. Cl.$^4$ .............................................. B60J 7/08
[52] U.S. Cl. ................................ 296/104; 248/251; 403/232.1; 296/214
[58] Field of Search ............... 296/100, 104, 118, 214; 211/105.1; 135/104, 106; 403/232.1; 248/221.1, 251, 264, 268

[56] References Cited

U.S. PATENT DOCUMENTS

| | | | |
|---|---|---|---|
| 905,142 | 12/1908 | Bond | 248/264 |
| 1,792,184 | 2/1931 | Racette | 248/268 |
| 2,368,405 | 1/1945 | Black | 296/118 |
| 2,969,284 | 1/1961 | Ambli | 296/100 |
| 3,066,974 | 12/1962 | Ambli | 296/100 |
| 3,367,347 | 7/1966 | Smith | 135/1 |
| 3,640,565 | 2/1972 | Anderson | 296/137 |
| 4,042,275 | 8/1977 | Glassmeyer et al. | 296/104 X |
| 4,114,861 | 9/1978 | Long | 403/232.1 X |
| 4,248,475 | 2/1981 | Johnsen | 296/100 |
| 4,273,377 | 6/1981 | Alexander | 296/100 |
| 4,461,509 | 7/1984 | Yaotani et al. | 296/214 |
| 4,479,677 | 10/1984 | Gulette et al. | 296/98 |
| 4,753,355 | 6/1988 | Hall et al. | 211/105.1 |

Primary Examiner—Margaret A. Focarino
Assistant Examiner—Frank H. Williams, Jr.
Attorney, Agent, or Firm—Scott R. Cox

[57] ABSTRACT

The invention disclosed is a roof bow unit to support a cover for the bed of a truck, trailer or the like. It is comprised of a pair of upwardly angled mounting members each containing a C-shaped socket wherein each member is securable to the lip of the bed of a truck or other vehicle, a pair of connecting end pieces each containing a rounded end each end, shaped to fit within the C-shaped socket of the mounting member and a bendable tube with an opening at each end into which the connecting end pieces are secured. This roof bow unit to support covers provides an inexpensive easy to manufacture a support for covers for truck beds and provides a significant improvement over prior art devices.

4 Claims, 2 Drawing Sheets

ROOF BOW SUPPORT FOR COVERS ON TRUCK BEDS

BACKGROUND OF THE INVENTION

1. Field of Invention

This invention relates to auxillary equipment for trucks. In particular, this invention relates to a bowed roof support for a covering or tonneau for the bed of a truck, trailer or the like.

2. Prior Art

It is common practice in the trucking industry to provide covers for cargo in open top truck beds, semi-trailers and the like. Since these covers must be put in place and removed frequently, it is desirable that it be accomplished in a simple and easy manner and preferably by one operator.

There are many prior art disclosures directed at various means for supporting covers of truck beds and trailers. For example, U.S. Pat. No. 3,066,974 discloses a top supporting bow member for trailers comprised of an elongated bow member with detachable coupling connections at each end, the coupling connection having a pin projecting laterally through the connection and through the end of the bow member. See the related U.S. Pat. No. 2,969,284.

U.S. Pat. No. 4,248,475 discloses a bow assembly for supporting a tarpaulin cover which includes a plurality of spaced transverse bow units and a headboard connected by longitudinally aligned removable supports. The ends of these supports are secured in openings in the side of the container.

U.S. Pat. No. 3,640,565 disclosed a telescoping cover assembly for open bed vehicles similar to that disclosed in U.S. Pat. No. 4,248,475. See other truck bed covers and supports disclosed in U.S. Pat. Nos. 4,273,377 and 3,367,347.

U.S. Pat. No. 2,368,405 discloses a roof bow for open top vehicles comprised of a pair of brackets positioned one on each upper side rail of the vehicle and a bowed member placed between the brackets and a means for locking the brackets in position, wherein the locking means is comprised of a lock bar secured at one end to a bracket and secured at the other end to the opposed side wall of the vehicle, said lock bar being bendable to span the distance between the ends.

U.S. Pat. No. 4,479,677 discloses a tonneau cover for the back of pickup trucks comprised of crossrods which fit in slots in the side piece of the cover wherein the side piece is secured to the side of the pickup truck by pins running through the side piece into the sides of the truck bed.

While each of these patents disclose a useful means for providing a support for a cover of an open bed vehicle, each has certain deficiencies such as complexity, high cost of production, difficulty of use by a single person, difficulty of attachment to a vehicle and other such problems.

Therefore, it is an object of this invention to provide a novel and improved roof bow unit to support covers of the beds of trucks and other vehicles.

It is another object of this invention to provide a novel and improved roof bow units to support covers for the beds of trucks comprised of simple, easy to produce parts.

It is a still further object of this invention to provide a roof bow unit to support covers for the beds of trucks and other vehicles which will securely support the cover of the bed of a truck.

These and other objects and features of the present invention will become apparent to those skilled in the art from a consideration of the following detailed description, drawings and claims. The description along with the accompanying drawings provides a selected example of construction of the device to illustrate the invention.

SUMMARY OF THE INVENTION

In accordance with the present invention there is provided a roof bow unit to support covers for the beds of trucks and other vehicles comprising:

(a) a pair of upwardly angled mounting members each containing a C-shaped socket, wherein each said mounting member is securable to the upper lip of a truck bed;

(b) a pair of connecting end pieces each containing a rounded end, each end shaped to fit within the C-shaped socket of the mounting member; and (c) a bendable tubular bar with an opening at each end into which the connecting end pieces are secured.

This roof bow unit to support covers for the beds of trucks and other vehicles can provide an inexpensive means for supporting a tarpaulin-like top for a truck or trailer bed. Because of its unique and simple construction, it provides a strong, secure, easy to manufacture and install support for the cover of a truck bed or trailer.

BRIEF DESCRIPTION OF THE DRAWINGS

The invention will now be described with reference to the accompanying drawings in which.

This invention will find great utility in the pick up truck or semi-trailer truck industry since it will provide a useful, inexpensive method of supporting a covering for the bed of a truck or semi-trailer. The roof bow support is easy to install and remove and inexpensive to produce.

DETAILED DESCRIPTION OF THE PREFERRED EMBODIMENT

Figure 1:
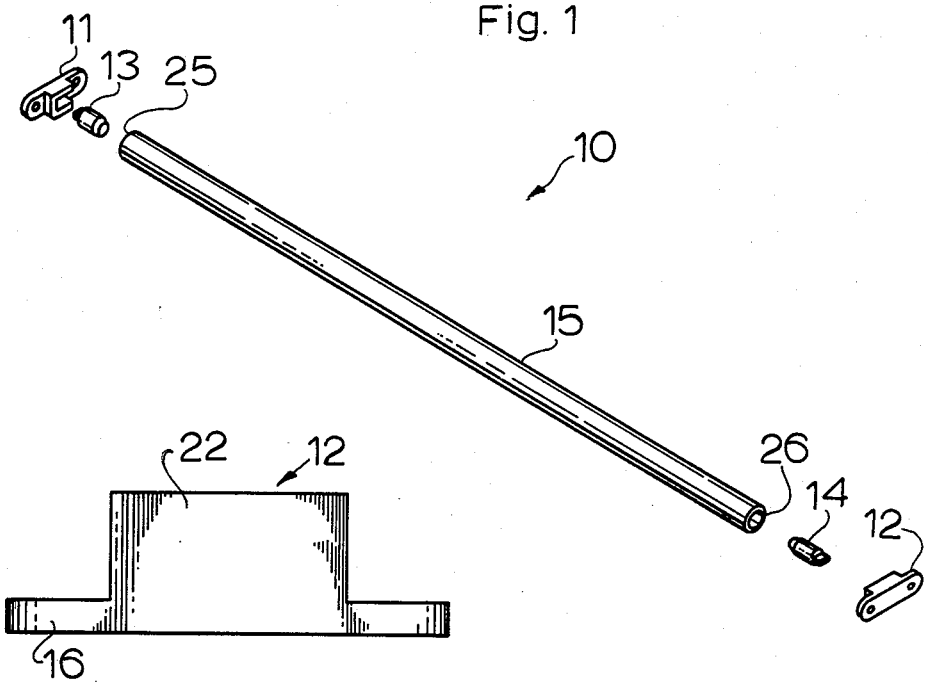
FIG. 1 is an exploded view of the bow support unit.

Although the roof bow support (10) is adaptable to a wide variety of uses, it is shown in the drawings for the purpose of illustration as embodied in a pair of upwardly angled mounting members, (11,12) a pair of connecting end pieces (13,14) and a bendable tubular bar. (15) See FIG. 1.

Figure 2:
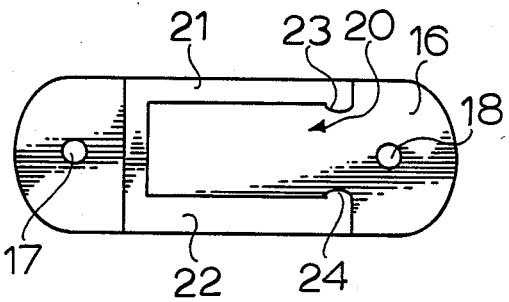
FIG. 2 is a side view of the upwardly angled mounting member of the bow support.
Figure 3:
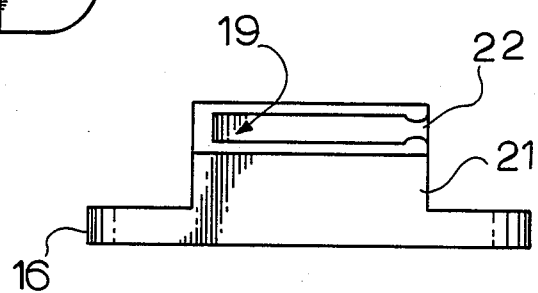
FIG. 3 is an end view of the upwardly angled mounting member of the bow support.
Figure 4:
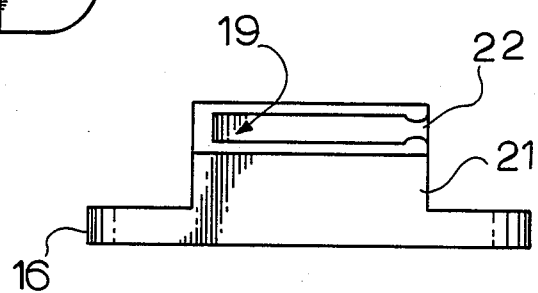
FIG. 4 is a side edge view of the upwardly angled mounting member of the bow support.

Each of the upwardly angled mounting members (11, 12) is comprised of a generally rounded rectangular flat section (16) with a plurality of openings preferably two openings (17,18) at each end for securing the member to the inside surface of the truck bed and an upwardly angled C-shaped socket (19). See FIGS. 2, 3 and 4. Conventional screws or metal bolts may be used to secure the members to the surface of the truck bed through these opening. An integral part of the mounting member is the upwardly angled C- shaped socket (19) with the opening of the C-shaped socket(20) at one end. At the end of the two arms (21,22) of the C are inwardly facing lips (23,24), each lip projecting toward the other. See FIG. 3. The mounting members can be produced from any strong, durable material such as aluminum, steel or high strength, moldable plastic and in a preferred embodiment, it is prepared from a high strength, moldable plastic.

The C-shaped socket(19) is angled slightly upward at an angle of about 10° to about 30° and preferably from about 15° to about 25°. See FIG. 4. The bottom arm (22) of the C-shaped socket extends out further from the surface of the mounting member than the upper arm (21) to provide additional support at the bottom of the socket for the bow support The arms of the C-shaped socket can project out from the surface any convenient distance and, in a preferable embodiment, they project out from about ¼ of an inch to about 1 inch.

A bendable tube (15) with openings at each end (25,26) is provided which runs between the mounting members. See FIG. 1. This tube can be constructed of any material which allows a certain amount of bend, such as aluminum or flexible plastic The tube can be of any shape that is useful for the support of the cover of a truck bed, such as round or oval, and in a preferred embodiment it has a round cross section.

Figure 7:
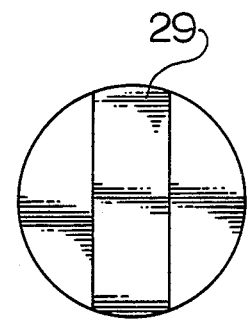
FIG. 7 is an end view of the connecting end piece of the bow support.
Figures 5, 6:
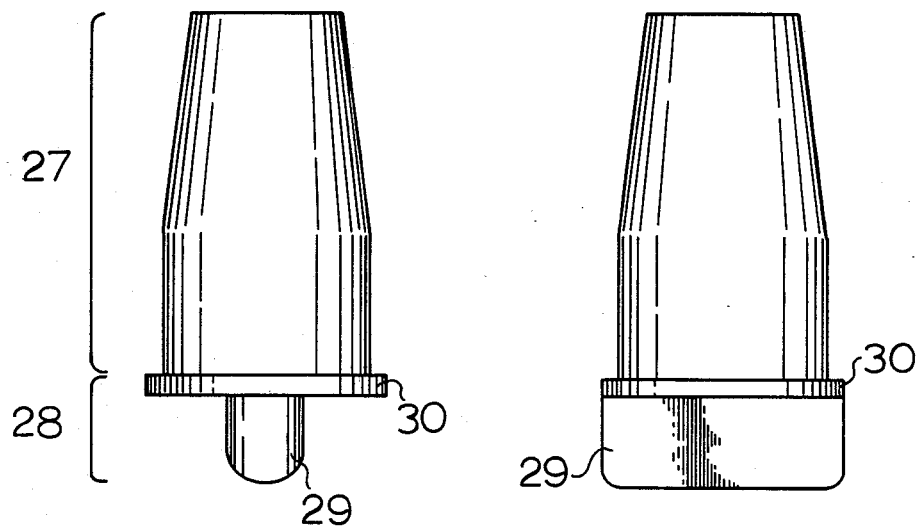
FIG. 5 is a side view of the connecting end piece of the bow support looking at the end of the rounded end section.
FIG. 6 is an side view of the connecting end piece of the bow support rotated 90° looking at the side of the rounded end section.

Secured in each end of the bendable tube is a connecting end piece. (13,14) See FIG. 4. Each connecting end piece, though generally of molded, one piece construction is separated into two sections. (27,28) The first section (27) of the connecting end piece is generally a tube-shaped portion which is generally of less diameter than the bendable tube. This tube-shaped piece fits within the end of the bendable tube to provide support for the tube and to secure the connecting end piece within the tube. Its shape will depend on the shape of the bendable tube. When the bendable tube is circular in cross section, the tube-shaped piece is also circular in cross section with its diameter increasing as it approaches the second section (28) of the connecting end piece. As long as the diameter of the end piece is not the same as or larger than the inner diameter of the tube, the end piece will fit within the tube and provide support for it. In a preferred embodiment the tube-shaped section fits securely within the bendable tube. See FIGS. 5, 6 and 7.

The second section (28) of the connecting end piece contains a rounded end (29) which is designed to fit within the C-shaped socket of the mounting member. See FIG. 5. Its size is such that it should fit securely within the socket to provide good support for the tubular bar. Between the tube-shaped section and the C-shaped rounded end section is a lip (30) larger in diameter than the diameter of the bendable tube to prevent it from projecting off of the connecting end piece. The connecting end pieces can be produced from the same type of material as the upwardly angled mounting member, and in a preferred embodiment, are produced from high strength plastic.

In operation each of a pair of upwardly angled mounting members (13,14) are secured to the inner surface of the walls of the bed of a truck or other such vehicle. Into each end of a bendable tubular bar (15) designed to fit within the space of the truck bed is secured a connecting end piece (13,14). Each of these connecting end pieces contain a rounded end (29) which fits within the C-shaped socket slot (19) of the upwardly angled mounting member (11,12) and a tube shaped section (27) which fits within each end of the bendable tube (25,26). By securing the various support sections together, there is provided a support for a cover of a pick up truck or other vehicle bed.

I claim:

1. A roof bow unit to support a cover for the bed of a truck or other vehicle wherein the bed of said vehicle contains an edge, wherein said roof bow unit is comprised of:
    a. a pair of upwardly angled mounting members wherein each member is angled upward wherein each member contains a C-shaped socket containing a bottom arm and an upper arm, wherein each arm contains an inwardly facing lip, wherein each lip projects toward the other lip, and wherein each said member is securable to the edge of the bed of the vehicle;
    b. a pair of connecting end pieces each containing a rounded end, each end shaped to fit within the C-shaped socket of the mounting member; and
    c. a bendable tubular bar with an opening at each end into which the connecting end pieces are secured.

2. The roof bow support of claim 1 wherein each connecting end piece is divided into two sections, the first section of which is an inner tube-shaped piece and the second section is a rounded end piece which fits within the C-shaped socket of the mounting member.

3. A roof bow unit to support a cover for the bed of a truck or other vehicle wherein the bed of said vehicle contains an edge, wherein said roof bow unit is comprised of:
    a. a pair of upwardly angled mounting members wherein each member is angle upward wherein each member contains a C-shaped socket containing a bottom arm and an upper arm, wherein the bottom arm extends further from the surface of the mounting member that the upper arm, wherein each arm contains an inwardly facing lip, wherein each lip projects toward the other lip, and wherein each said member is securable to the edge of the bed of the vehicle;
    b. a pair of connecting end pieces each containing a rounded end, each end shaped to fit within the C-shaped socket of the mounting member; and
    c. a bendable tubular bar with an opening at each end into which the connecting end pieces are secured.

4. The roof bow support of claim 3 wherein each connecting end piece is divided into two sections, the first section of which is an inner tube-shaped piece and the second section is a rounded end piece which fits within the C-shaped socket of the mounting member.

* * * * *